United States Patent [19]

Pollock

[11] Patent Number: 5,650,070
[45] Date of Patent: Jul. 22, 1997

[54] AEROBIC LONG VERTICAL SHAFT BIOREACTORS

[75] Inventor: David C. Pollock, Calgary, Canada

[73] Assignee: Deep Shaft Technology Inc., Calgary Alberta, Canada

[21] Appl. No.: 616,959

[22] Filed: Mar. 14, 1996

[51] Int. Cl.⁶ ...................................................... C02F 3/02
[52] U.S. Cl. ........................... 210/612; 210/620; 210/199; 210/220
[58] Field of Search ........................ 210/620, 621, 210/626, 629, 630, 194, 199, 220, 170, 758, 761, 612, 613

[56] References Cited

U.S. PATENT DOCUMENTS

| | | | |
|---|---|---|---|
| 4,086,160 | 4/1978 | Roesler | 210/199 |
| 4,172,034 | 10/1979 | Carlsson et al. | 210/620 |
| 4,217,111 | 8/1980 | Crane | 210/626 |
| 4,230,563 | 10/1980 | Roesler | 210/629 |
| 4,253,949 | 3/1981 | Hines et al. | 210/194 |
| 4,272,375 | 6/1981 | Pollock | 210/194 |
| 4,272,379 | 6/1981 | Pollock | 210/621 |
| 4,278,546 | 7/1981 | Roesler | 210/626 |
| 4,279,754 | 7/1981 | Pollock | 210/608 |
| 4,287,070 | 9/1981 | Pollock | 210/626 |
| 4,297,217 | 10/1981 | Hines et al. | 210/621 |
| 4,304,665 | 12/1981 | Hines | 210/194 |
| 4,308,144 | 12/1981 | Saito | 210/620 |
| 4,338,197 | 7/1982 | Bolton | 210/621 |
| 4,340,484 | 7/1982 | Pollock et al. | 210/607 |
| 4,351,730 | 9/1982 | Bailey et al. | 210/629 |
| 4,367,146 | 1/1983 | Pollock et al. | 210/608 |
| 4,407,718 | 10/1983 | Pollock | 210/626 |
| 4,416,781 | 11/1983 | Bailey et al. | 210/629 |
| 5,192,441 | 3/1993 | Sibony et al. | 210/630 |

*Primary Examiner*—Thomas G. Wyse
*Attorney, Agent, or Firm*—Cushman Darby & Cushman IP Group of Pillsbury Madison & Sutro LLP

[57] ABSTRACT

An improved biomass waste treatment process wherein an aerobic biological reaction takes place in a vertical chamber having a first portion defining a first zone and a second portion defining a second zone below said first zone, said process comprising feeding a first biomass influent having a first biomass concentration to the first zone; feeding a first oxygen-containing gaseous stream to the first zone to effect mixing of the first oxygen-containing gaseous stream with the first biomass influent to effect circulation in unidirectional upward flow by gas lift and bioxidation to provide a first biomass effluent having a second biomass concentration; feeding first biomass effluent in plug flow mode to the second zone; feeding a second oxygen-containing gaseous stream to the second zone to effect mixing of the second oxygen-containing gaseous stream with the first biomass effluent without re-circulation to the first zone to effect bioxidation and provide a second biomass effluent and removing second biomass effluent from the second zone.

11 Claims, 6 Drawing Sheets

AEROBIC LONG VERTICAL SHAFT BIOREACTORS

FIELD OF THE INVENTION

This invention relates to aerobic long vertical shaft bioreactors and processes, particularly said bioreactors and processes for mesophilic aerobic waste water treatment and autothermal thermophilic aerobic sludge digestion.

BACKGROUND TO THE INVENTION

Operations of prior art vertical shaft bioreactors for waste water treatment rely on the liquid depth in the reactor to improve oxygen solubility and, thereby, oxygen transfer rate based on the principles of Henry's Law. Such prior art reactors have features that are different from the others and wherein each claims to improve overall reactor and process performance.

Bioreactors of use in the Biohoch Process (Germany), for instance, have reactors that are approximately 20 m deep and, thus, of optimum depth for oxygen transfer per unit of energy employed. Biohoch reactors, however, are completely back-mixed reactors wherein the substrate concentration and, therefore, the rate of reaction is the same throughout the reactor.

Multi Reactors (Holland) use a simulated plug flow configuration where a number of back-mixed cells are placed in a vertical column, generally, totalling about 20 m–50 m in depth. This arrangement allows the reaction rate to change with depth, i.e. time in the reactor. However, the highest oxygen concentration occurs at the bottom of the column wherein the reaction rate is lowest.

Reactors known as the ICI "Deep Shaft" bioreactors, generally, comprise a combination of plug flow and back-mix reactors achieved by using a high internal recycle flow in a very deep reactor. The shaft of the ICI process is 40 m or greater in depth and features a down-flow section (downcomer) having liquor flowing at sufficient velocity to cause undissolved aeration gas to be entrained in, and dragged down, to the bottom of the reactor by liquid flow before returning to the surface.

In general, the oxygen transfer capability of Deep Shaft bioreactors and processes far exceeds the uptake rate required in a typical bioreactor. The generous capacity of a Deep Shaft bioreactor process to effect dissolution of gas into solution provides gas saturation levels sufficient to achieve solids/liquid separation by flotation. Deep Tanks and Multi Reactors have also had moderate success using flotation separation, but at relatively low mixed liquor/solids concentrations.

Long vertical shaft bioreactor systems suitable for the treatment of waste water by activated sludge processes are known and disclosed, as for example, in U.S. Pat. No. 4,279,754 issued to Pollock.

A vertical shaft bioreactor system for the treatment of waste water, typically, comprises a bioreactor, a solid/liquid separator and intervening apparatus in communication with the bioreactor and separator. As fully described in U.S. Pat. No. 4,279,754, such bioreactors essentially comprise a circulatory system which includes at least two substantially vertical side-by-side chambers in communication with each other at their upper and lower ends, with their upper ends being connected through a surface basin. The waste water for treatment is caused to circulate repeatedly between the downflow chamber, termed the downcomer and the upflow chamber, termed the riser. Normally, the waste-containing liquor, referred to as "mixed liquor", is driven through the circulating system by injection of an oxygen-containing gas, usually air, into one or both of the chambers. Typically, in a 500 ft. deep reactor, air injection at a pressure of 100 pounds per square inch is at a depth of about 200 ft. At start-up of the bioreactor, a mixture of air and influent waste water is injected into the riser in the nature of an air lift pump. However, once circulation of the mixed liquor begins, air injection can be also into the downcomer. The fluid in the downcomer has a higher density than the liquid-bubble mixture of the riser and thereby provides a sufficient lifting force to maintain circulation. Usually the surface basin is fitted with a baffle to force mixed liquor at the top of the riser to traverse a major part of the basin to effect release of spent gas before the liquor again descends in the downcomer for further treatment.

Influent waste water is introduced at depth into the riser chamber through an upwardly directed outlet arm of an influent conduit. An oxygen-containing gas, usually air, is injected into the influent liquor in the outlet arm of the influent liquor conduit. In addition to oxygenating the waste liquor, the injected gas acts to create an air lift pump which draws the influent waste into the bioreactor riser. Effluent liquor is withdrawn from the riser through an effluent liquor conduit having its inlet located in the riser at a point below the outlet of the influent liquor conduit. During operation of the bioreactor the flow of influent liquor to and effluent liquor from the bioreactor are controlled in response to changes in level of liquid in the connecting upper basin.

The injected oxygen-containing gas dissolves in the mixed liquor as the liquor descends in the downcomer to regions of greater hydrostatic pressure. This dissolved oxygen constitutes the principal reactant in the biochemical degradation of the waste. As the circulating mixed liquor ascends in the riser to regions of lower hydrostatic pressure the dissolved gas separates and forms bubbles. When the liquid/bubble mixture from the riser enters the basin, gas disengagement occurs.

Reaction between waste, dissolved oxygen, nutrients and biomass substantially takes place during circulation through the downcomer, riser and basin bioreactor system. The products of the reaction are carbon dioxide and additional biomass, which in combination with unreacted solid material present in the influent waste water, forms a sludge.

Autothermal thermophilic aerobic digestion, herein termed ATAD, is a waste water sludge treatment process whereby pre-thickened influent sludge is digested, stabilized and pasteurized for pathogen control. ATAD has been studied and developed since the 1960's, and currently is successfully implemented in several European countries and Canada. ATAD systems are normally two to three stage aerobic processes that operate under themophilic temperature regimes (45° C.–60° C.) without supplemental heat.

In a conventional ATAD system, the reaction tanks, normally two or three, are connected in series, and raw thickened sludge is batch fed into the first reactor. Typically, it is then aerated and mixed with an impeller or venturi type mixer/aerator. Since the incoming raw sludge is at a temperature of about 10° C. to 20° C., the micro-organisms present in the influent are primarily upper psycrophils and lower mesophils. During the initial aeration start up, the mesophils consume the organic materials herein termed the "organics" in the sludge and generate enough heat to raise the temperature to the lower thermophilic range. Subsequently, thermophils begin to dominate the culture, further oxidize the biomass and raise the temperature of the liquor to about 50° C. to 55° C. This first reaction substantially stabilizes the sludge and represents about 60% of the bioxidation possible in a two-stage system. The first reactor does not completely pasteurize the sludge.

Microbes that biologically function in the temperature range of 10° C.–20° C. are "psycrophilic", those that operate in the range of 20° C.–42° C. are "mesophilic", while those that dominate in the temperature range of 45° C.–60° C. are "thermophilic". It is understood that there is no clear operating boundary between mesophils and thermophils, since some of each species exist at both mesophilic and thermophilic temperatures.

In "waste water treatment", nutrients and organics are removed from the waste water and a fraction is converted to new cell matter (biomass) or sludge. The resulting water product can then be recycled or discharged. The sludge produced in waste water treatment can be recycled and/or digested prior to disposal. In "sludge digestion" the sludge is stabilized i.e. the cell mass is reduced and gases are released and pasteurized (pathenogenic reduction). The product water can also be recycled or discharged. Waste water treatment usually takes place in less than one day, while digestion takes several days.

The term "autothermophilic" describes thermophilic processes that generate heat energy.

Meosphils will generally produce more sludge than thermophils and they can oxidize ammonia to nitrate, while thermophilic microbes do not. Mesophils are robust and can withstand shock loads more effectively than thermophils, but they are not as efficient at biodegrading some refractory compounds as can thermophils. Thermophilic processes are favoured in aerobic digestion since the consumption of digestible biomass creates only a small amount of new cell mass resulting in overall volatile suspended solids (VSS) reduction. This, thus, leaves more of the biodegradable portion to be converted to heat.

In a conventional ATAD Fuchs two reactor system and a 5 day retention time, aeration is stopped each day for one hour and approximately ⅖ of the contents of Reactor II is removed. This allows ⅖ of Reactor I volume to be transferred to Reactor 11 and Reactor 1 topped up with new raw sludge. Aeration is resumed for 23 hours and the cycle is repeated. Reactor 1, therefore, retains ⅗ of its volume, heat and thermophilic culture in order to thermophilically process incoming waste. Reactor 11 receives ⅖ of Reactor 1 sludge containing a culture of thermophils and, very importantly, the latent heat in the transferred fluid. This transfer allows Reactor 11 to operate at higher thermophilic and lower stenothermophilic temperatures (55° C.–65° C.), even though there is a reduced amount of organic matter available for bioxidation and heat generation.

Beneficially higher temperatures in Reactor 11 are prevented due to the diminishing amount of biodegradable organics, the loss of heat in the aeration off-gas, the transfer of heat to the treated sludge leaving the tank, and the loss of heat through the reactor wall.

A heat exchange may be provided to recover heat from the effluent of Reactor 11 to heat up the influent of Reactor 1. This approach has limited value since oxygen solubility decreases with increasing temperature.

The effect of temperature on required residence time in the reactor for pathogen control in a Class A (EPA CFR40 Reg. 503) sludge is of critical importance. At 55° C., the required residence time is about 72 hours, whereas at 65° C. the residence time is about 2½ hours. The U.S. EPA 503 regulation and the European (German) ATAD set standards coverage at about 67° C., which is the practical maximum for existing ATAD processes. Pre-stage technology is not a true ATAD process since it is externally pre-heated, i.e. generated reaction heat is recycled to influent sludge as opposed to thermophil recycle as in ATAD.

Early attempts using ATAD technology with only one tank were moderately successful, but long residence times of 10–15 days were required for pathogen kill. Batch feeding of the single tank on a daily basis reinoculated the treated sludge, which reduces the quality to an EPA Class B sludge. The two tank system evolved to control reinoculation, by emptying part of Reactor 11, transferring part of Reactor 1 into Reactor 11, then topping up Reactor 1. Experience in Europe recommends the time between batch transfers should be limited to once per day, depending on Reactor temperatures, and that the total processing time should be at least 5 days and equally split between the two reactors.

The empirical five day minimum has more to do with the biodegradation of organics than the pasteurization of sludge. This indicates that biodegradation and not pasteurization or reinoculation time must govern the design of bioreactor processes and apparatus.

If the biodegradation rate could be accelerated to match the time for pasteurization, then residence time could be as low as two days and equivalent to the reinoculation time of current ATAD systems. However, a two day retention in a conventional ATAD would require 100% of Reactor 1 to be transferred to Reactor 11 each day. By doing this, all the heat and thermophils would be lost in Reactor 1 and the process reaction would cease.

There is, thus, a need to provide improved apparatus and processes to provide accelerated and more efficacious bioxidation of biomass in waste water and sludge digestion.

SUMMARY OF THE INVENTION

It is an object of the present invention to provide apparatus and processes to effect more efficacious bioxidation of biomass.

Accordingly, in one aspect the invention provides an improved biomass waste treatment process wherein an aerobic biological reaction takes place in a vertical chamber, said chamber having a first portion defining a first zone and a second portion defining a second zone below said first zone, said process comprising a) feeding a first biomass influent having a first biomass concentration to said first zone;

b) feeding a first oxygen-containing gaseous stream to said first zone to effect mixing of said first oxygen-containing gaseous stream with said first biomass influent to effect circulation in unidirectional upward flow by gas lift and bioxidation to provide a first biomass effluent having a second biomass concentration;

c) feeding said first biomass effluent in plug flow mode to said second zone;

d) feeding a second oxygen-containing gaseous stream to said second zone to effect mixing of said second oxygen-containing gaseous stream with said first biomass effluent without re-circulation to said first zone to effect bioxidation and provide a second biomass effluent;

e) removing said second biomass effluent from said second zone.

In a further aspect, the invention provides an improved long vertical shaft bioreactor comprising a long vertical chamber having a first portion defining a first zone, and a second portion defining a second zone below said first zone; means for feeding a first biomass influent to said first zone; means for feeding a first oxygen-containing gaseous stream to said first zone to effect mixing of said first gaseous stream with said first biomass influent to provide a first admixed stream and unidirectional flow of said admixed stream and bioxidation of said first biomass to provide a first biomass effluent having a second biomass concentration; means for feeding said first biomass effluent in whole or in part in plug flow mode to said second zone; means for feeding a second oxygen-containing gaseous stream to said second zone to effect mixing of said second oxygen-containing gaseous stream with said first biomass effluent to effect bioxidation without recirculation to said first zone to provide a second biomass effluent; means for removing said second biomass effluent from said second zone.

The apparatus and processes of the present invention comprise use of long vertical shaft bioreactors with mesophilic waste water treatment and autothermophilic aerobic digestion.

In one embodiment, the bioreactor system of the present invention uses the efficiency of the shallower vertical reactor processes with the gas transfer capability of a deeper shaft. Preferably, the reactor of the present invention is of medium depth and is deeper than Biohoch, Multireactor or Deep Tank reactors, but falls in the range of depths disclosed by aforesaid U.S. Pat. No. 4,279,754. The reactor, according to the invention, preferably, has three zones, viz. (i) a plug flow zone with internal recycle at the top, (ii) a back-mixed zone in the middle, and (iii) a plug flow zone with no recycle aspect at the bottom. All of these zones are in the same reactor body. An optional configuration can provide zone B or zone C with a plug flow regime with internal recycle.

In regards to oxygen requirements, shallower vertical reactor configurations are designed to accommodate the biological oxygen uptake rate of the reactor biomass solids. However, when solids separation by flotation is employed, the flotation design is governed by the more critical air: solids ratio. The level of dissolved air required for solids separation at concentrations over 3000–5000 mg/L by flotation is much more difficult to achieve than the oxygen level required for bioxidation.

Published data indicates that, with sufficient mixing, dissolved oxygen levels over 2 mg/L do not significantly increase the biological reaction rate. It is also well-known that effective flotation separation of biosolids requires a minimum air to solids ratio of 0.010 to 0.015. Flotation separation devices are shown to be effective at solids concentrations of up to 10,000–15,000 mg/L. These criteria translate to a total dissolved gas requirement in the vertical reactor of preferably 150–225 mg/L and, assuming atmospheric air is the gaseous medium, the equivalent dissolved oxygen level in the fluid would be 35–50 mg/L. Clearly, the dissolved gas requirement for flotation substantially exceeds the dissolved gas, i.e. oxygen component requirement for bioreactions. The reactors according to the present invention achieve both these criteria.

In regard to hydraulic residence and thermal gradient, suppliers of dissolved air flotation equipment have shown that, when compared to high pressure and short residence time, the same amount, or more, dissolved gas can be achieved with lower pressures and longer residence times. The reactors of the present invention, when compared to deeper vertical shafts with comparable volumes and processing times, maintain lower fluid velocities at relatively high pressures and, therefore, longer hydraulic residence times at these pressures.

In the processes of the present invention, a gradient in organic loading (F/M, or food to micro-organism ratio) and therefore kinetic rate, exists from top to bottom of the invention reactors. The kinetic rate gradient translates into a thermal gradient where one end of the reactor runs hotter than the other. One preferred embodiment may increase 3° C. at 1,000 mg/L BOD, while another preferred embodiment may increase 30° C.–50° C. at 40,000 mg/L TSS. I have found that the bottom end of the reactor is significantly hotter than the top. Without being bound by theory, I believe that this is because warm effluent from the top circulates to the bottom and effluent air and liquid streams from the bottom end of the reactor pass through the upper end and transfer their heat. Thus, the top and bottom zones heat each other, are recycled and build heat in the system. It is at the top that the larger heat losses occur, due to the spent gas and processed sludge exiting and the raw sludge entering the top end of the reactor. In consequence, the bottom zone of the reactor will always be hotter than the top zone.

Accordingly, the reactor configuration of the present invention provides in one embodiment efficacious thermophilic sludge digestion, where the treated sludge exits the reactor at a higher temperature than at the inlet of the reactor.

In an alternative process according to the invention, digestion, stabilization, and pasteurization of sludge under autothermophilic aerobic conditions are carded out. There are significant differences between operation of the waste water treatment reactors, according to the invention herein termed "VERTREAT" processes, and the sludge processing conditions, herein termed "VERTAD" processes of the present invention. The concentration of organic matter in the influent liquor; hydraulic retention time—wherein the VERTAD process generally has higher retention times; processing time—wherein the VERTREAT process is in the order of hours, where typically, the VERTAD process is in the order of days and main aeration head location are different. The sludge processing VERTAD reactor also achieves a minimum internal thermal gradient from the upper zone to lower zone of 10°–15° C. The thermal gradient from influent raw sludge to the stabilized final produce is about 65°–70° C. The VERTREAT process usually operates under 40° C. for optimum efficiency of mesophil microbes.

Foam production increases as the F/M ratio decreases through cell lysis and both of the VERTREAT and VERTAD bioreactor configurations have the ability to control foam. Consequently, much of the foam originates in the bottom zone of the reactor, since the F/M ratio is lower at the bottom. Because the foam preferentially travels with the spent air stream, it is transferred to the top zone of the reactor where it is more easily degraded.

Another benefit of the VERTAD configuration is that hot off-gas from the pasteurized end of the reactor passes upward through the influent end and thereby transfers heat without any risk of reinoculation. Also, this reactor has the capability of operating above the range of thermophilic bacteria, i.e. above 60°–65° C., at which temperatures stenothemophilic bacteria will dominate.

Aerobic digestion occurs when an active biomass under continuous aeration has insufficient food to support normal biological growth. The biological life cycle causes older cells to die off and these are then consumed as food for new cells. This process is known as bio-oxidation and is an exothermic reaction, since no new food, or insufficient food, enters the digester. There is a net reduction in biomass accompanied by an increase in temperature. At a temperature of up to about 42° C., the microbes operate in the mesophilic range, wherein they consume food and produce relatively more cell mass, but less heat. Temperatures greater than 42° C. favor thermophilic and stenothermophilic microbes, which convert the food into fewer new cells, but generate more heat when compared to mesophils.

At temperatures about 55° C., the heat generated is sufficient to kill many of the pathogenic organisms and some viruses. If elevated temperatures are maintained for longer periods of time a Class A municipal sludge is produced (EPA CFR40Reg. 503), which is suitable for land application. To meet this classification, a minimum time-temperature criterion must be met as hereinafter described. Certain vector attraction, i.e. characteristics of sludge that attract organisms capable of transporting infectious agents, requirements must be satisfied.

In the VERTAD process according to the invention, thermophils are advantageously recycled through the ability of the plant design to circulate very high concentrations of bio-solids. Recycle of heat is inherent in the design of a VERTAD reactor because of its circulation configuration. I have found that in a biological system, recycling thermophils is more important than recycling heat as is currently practiced in conventional ATAD technology.

In consequence of recycling the thermophils into the upper zone of the reactor in a concentrated form, enabling a larger volume, hence load of raw sludge can be delivered into the reactor for biodegradation. This is equivalent to doubling the F/M in the reactor, which is actually preferred in the VERTAD process. I have found that the VERTAD process provides sufficient mixing and oxygen transfer at these higher loads than could be done by a surface aeration device or surface reactor.

The present prior art approach to feeding raw sludge to an ATAD is to gravity thicken the raw sludge to about 4% solids. For higher concentrations, a centrifuge or other mechanical means is required and it is unlikely that the undigested sludge would thicken to more than 10–12% solids. About 3 times this concentration can be achieved upon thickening of a thermophilically digested sludge using the same equipment. Recycling 18–20% solids content of thermophically digested sludge raises the solids concentration in the reactor to 12–14% at the feed end. The thermophils content of the sludge also increases to about 3–4%. Using a centrifuge on recycle sludge provides an 18–20% product sludge as well. Using a centrifuge or other mechanical means to thicken raw sludge precludes using that device to thicken final product sludge due to potential contamination.

The main essential feature of ATAD processes is that the reactors in series are fed with a pre-thickened sludge—primary, secondary or mixed. When the VERTREAT process is used with flotation separation as the secondary treatment, the sludge (mixed primary and secondary) is produced in a thickened form, which eliminates the sludge-thickening step inherent in the ATAD process. The VERTAD process replaces the two reactor, sometimes three reactor, configuration of a conventional ATAD system. The ATAD system also must be built on the surface.

Aeration and mixing are the most important design considerations in the ATAD process (EPA Manual for Technology Transfer of ATAD, EPA/625/10-90/007). I have found that the VERTAD process has extremely good mixing capabilities because of aeration and circulation. Due to the increased solubility of oxygen at pressures associated with depth, oxygen transfer is much higher than in surface tanks. The optimum configuration for aeration and mixing in a surface ATAD reactor is a height of 2 to 5 tank diameters. The height is limited to about 22 ft. using existing aeration technology. The VERTAD process is generally 10–100 reactor diameters deep, with aeration typically operating at, for example, depths of 200 ft. with 100 pounds per square inch air pressure and 350 ft. with 150 pounds per square inch air pressure. The function of the ATAD reactor is replaced in the VERTAD process by stacking the two or three process functions, i.e. reactor zones in one deep vertical VERTAD reactor. The bottom of the reactor preferably is the hot zone and is the final treatment segment of the process. The reactor is very well insulated from heat loss or temperature change because of the geologic mass surrounding the reactor.

Conventional deep shaft processes incorporate upward and downward flowing aeration gas, usually air. The VERTAD and VERTREAT processes of the present invention utilize only upward gas flow. Deep shaft effluent is withdrawn at a location that is significantly above the shaft bottom, whereas the VERTAD and VERTREAT processes withdraw effluent from the reactor bottom. The recycle stream in deep shaft process recycles the contents of the shaft whereas VERTAD and VERTREAT reactors recycle only a fraction of the contents of the reactor. Further, deep shaft processes require the internal recycle to flow at certain critical velocities to achieve proper gas entrainment for aeration whereas VERTAD and VERTREAT processes require no critical velocities for aeration. Deep shaft process has dispersed gas bubbles circulating via the shaft bottom whereas VERTAD and VERTREAT processes have only dissolved gas at the bottom of the shaft. Deep shaft process requires the start-up air to be gradually transferred from riser to downcomer chambers, while start-up in the VERTAD and VERTREAT processes is simplified by merely commencing up-flow air to initiate circulation and oxidation. Dissolved gas levels are depth dependent in the deep shaft configuration, while higher levels of dissolved gas are attained by increasing residence times under lower pressures in VERTAD and VERTREAT. F/M in the deep shaft is essentially constant due to large internal recycle, while F/M decreases from top to bottom in VERTAD and VERTREAT bioreactors, which inhibits foam generation, since the foam stream from the low F/M reactor passes through the higher F/M reactor where it is degraded. Deep shaft digester processes comprise a combination plug flow and back mix reactor with high internal recycle and very little thermal gradient, whereas the VERTREAT process has a plug flow zone with internal recycle, a back mixed zone, a plug flow zone with no internal recycle and very little thermal gradient. The VERTAD process has the same zones as VERTREAT process but with a considerable top to bottom thermal gradient.

BRIEF DESCRIPTION OF THE DRAWINGS

In order that the invention may be better understood, preferred embodiment will now be described by way of example only, with reference to the accompanying drawings wherein.

DETAILED DESCRIPTION OF PREFERRED EMBODIMENTS

Figure 1:
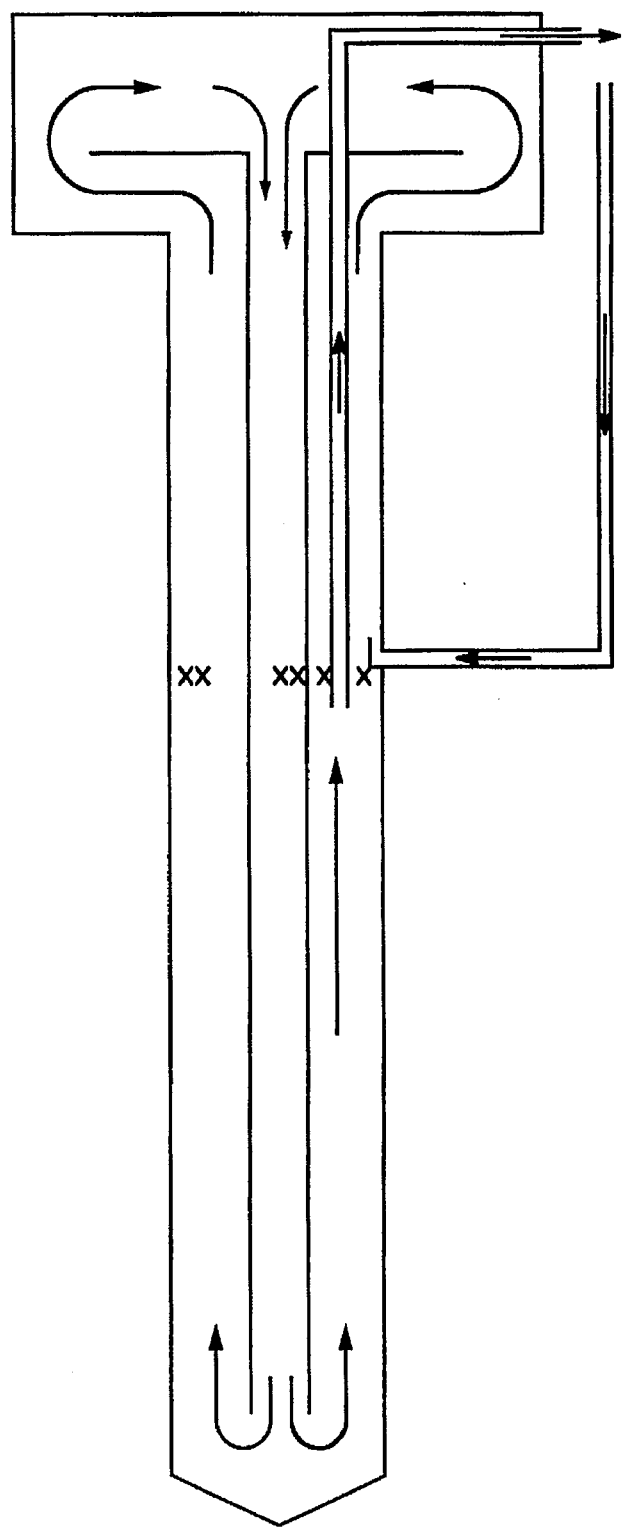
FIG. 1 is a diagrammatic vertical section through a prior art deep shaft bioreactor.

FIG. 1 illustrates the basis and fundamental design of a prior art deep shaft bioreactor with its attendant features as hereinbefore described.

Figure 5:
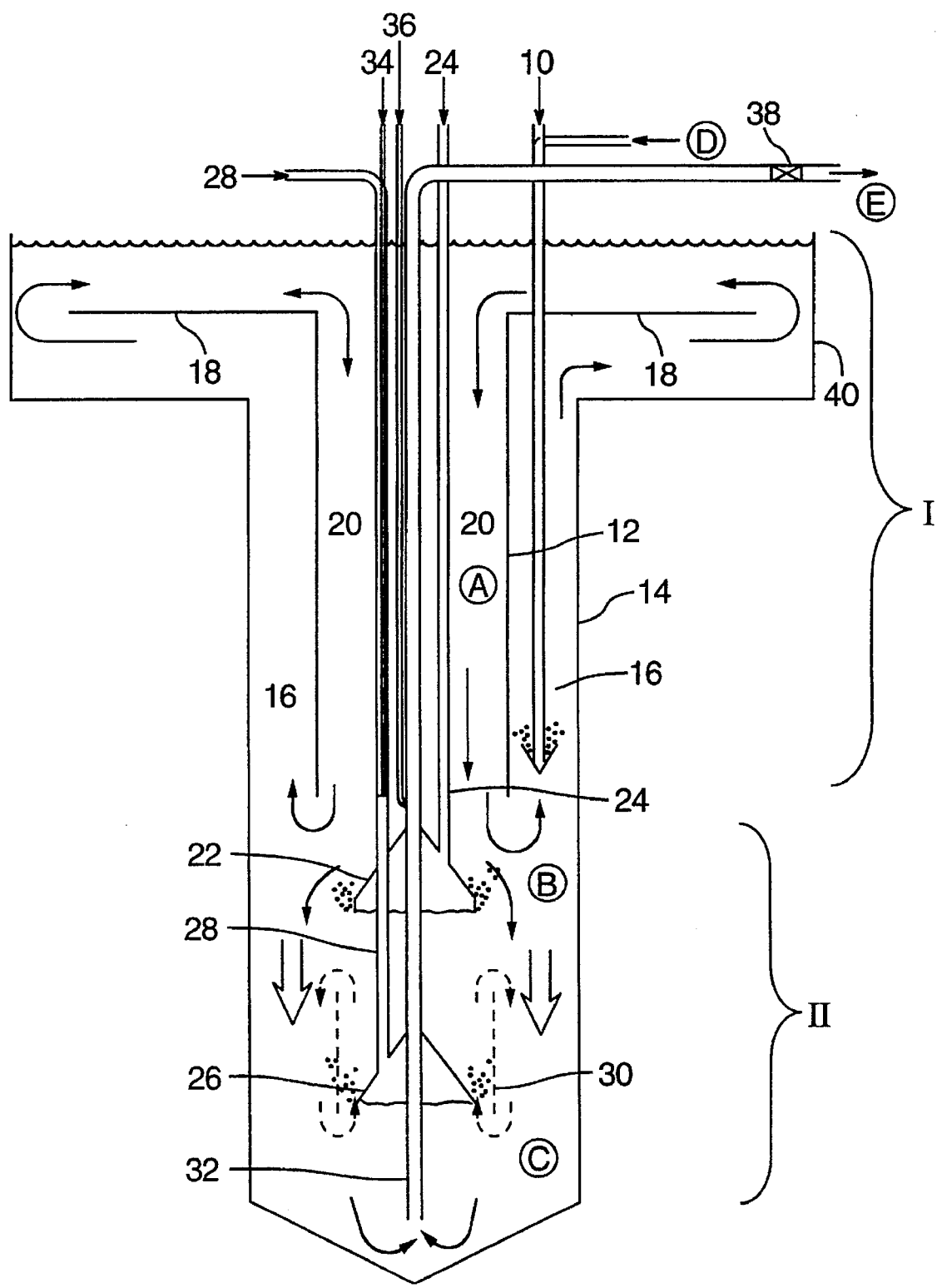
FIG. 5 is a diagrammatic vertical section through an alternative embodiment of a bioreactor according to the invention for use in sludge treatment.

Generally, with reference to FIG. 5, the VERTAD sludge digestion process utilizes the zone at the top half of the vertical volume of the inground shaft as reactor 1 and the zone at the bottom half as reactor 11. Each of these zones operate at different temperatures. Since only the off-gas and sludge extraction line of zone 11 pass through zone 1, only waste heat and not the bulk liquid heat of zone 11, is transferred to the cooler zone 1.

The VERTAD process can run in either a batch mode or continuous flow. For very small plants, batch mode is preferred, while plants processing larger flows would be operated continuously.

The top section of the VERTAD configuration contains a conventional draft tube (or flow recycle tube) which circulates the fluid in zone 1. In this embodiment, it has a 130 m deep vertical shaft having a draft tube of about 65 m long. The top 65 m of the reactor is designed to operate as a plug flow reactor with a higher internal recycle rate of about 1000:1 based on a two day retention time. Sludge is introduced at the bottom of zone 1 along with the air used to circulate fluid in the draft tube. Oxygen contained in this air is consumed by the bioxidation reaction by the time the flow reaches the top. The fluid is then transported down the draft tube to the bottom of zone 1 where a portion flows to zone 11 and the remainder mixed with influent sludge and air in the upflow section in zone 1 and the cycle repeats.

In general, zone 11 is designed strictly as a plug flow regime with no internal recycle. Liquor from zone 1 enters at the top of zone 11 and exits at the bottom. Aeration in zone 11 is configured with the aeration head set approximately ¾ of the way to the bottom.

The bottom ¼ of zone 11 has no aeration. This ensures true plug flow conditions in a high dissolved oxygen soak zone with no possibility of short circuiting. Under normal operating conditions, dissolved oxygen could reach 40–50 mg/L in this zone. The low oxygen uptake rate of the treated sludge combined with the reduced viable cell mass resulting from digestion allows this soak zone to remain completely aerobic for 8–12 hours.

Figure 6:
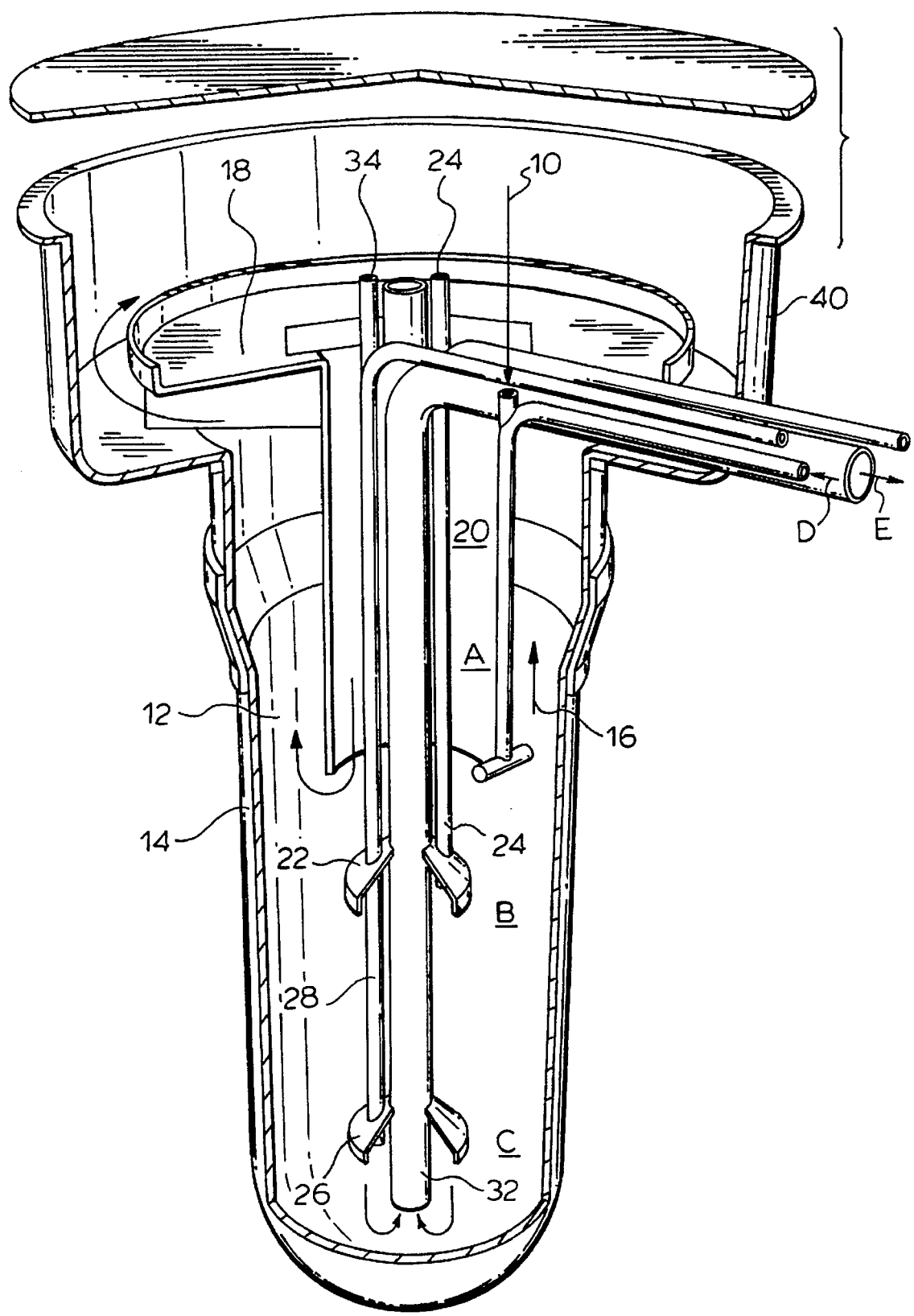
FIG. 6 is an isometric cut-away view of a further embodiment of a bioreactor according to the invention for use in sludge treatment; and wherein the same numerals denote like parts.

In operation, with reference now to FIGS. 5 and 6, compressed air is introduced through feed line 10 into the annular space between draft tube 12 and reactor wall 14. Circulation is induced by a simple air lift principle causing fluid to flow up annual space 16, around de-gas plate 18, to and through downflow zone 20. Unlike other vertically circulated processes, there are no critical velocities to respect with regard to suspension of biomass in upflow section 16, nor is the entrainment of air in downflow tube 20 required. Liquors in the reactor can circulate in a wide range of velocities. For example, a highly loaded VERTAD reactor requires an upward velocity of about 1–5 ft/sec. and a downward velocity of about 1–5 ft/sec. The upward velocity is based on the rate of utilization of oxygen in the bioreaction. For example, at 1–5 ft/sec. in upflow section 16, the oxygen in the air is substantially consumed in 40–200 seconds. The downflow zone 20 is designed to transport zone 1 effluent to zone 11 and also recycle sufficiently treated zone 1 effluent to dilute zone 1 influent. This reduces the oxygen uptake rate to match the oxygen available from the air lift. Since the treatment capacity in the downflow tube is not counted in the bioreaction, transfer time ideally is as short i.e. as high a velocity as possible in order to minimize draft tube size and maximize the annular volume (low velocity) in upflow section 16, where the bulk of the bioreaction occurs.

Figure 3:
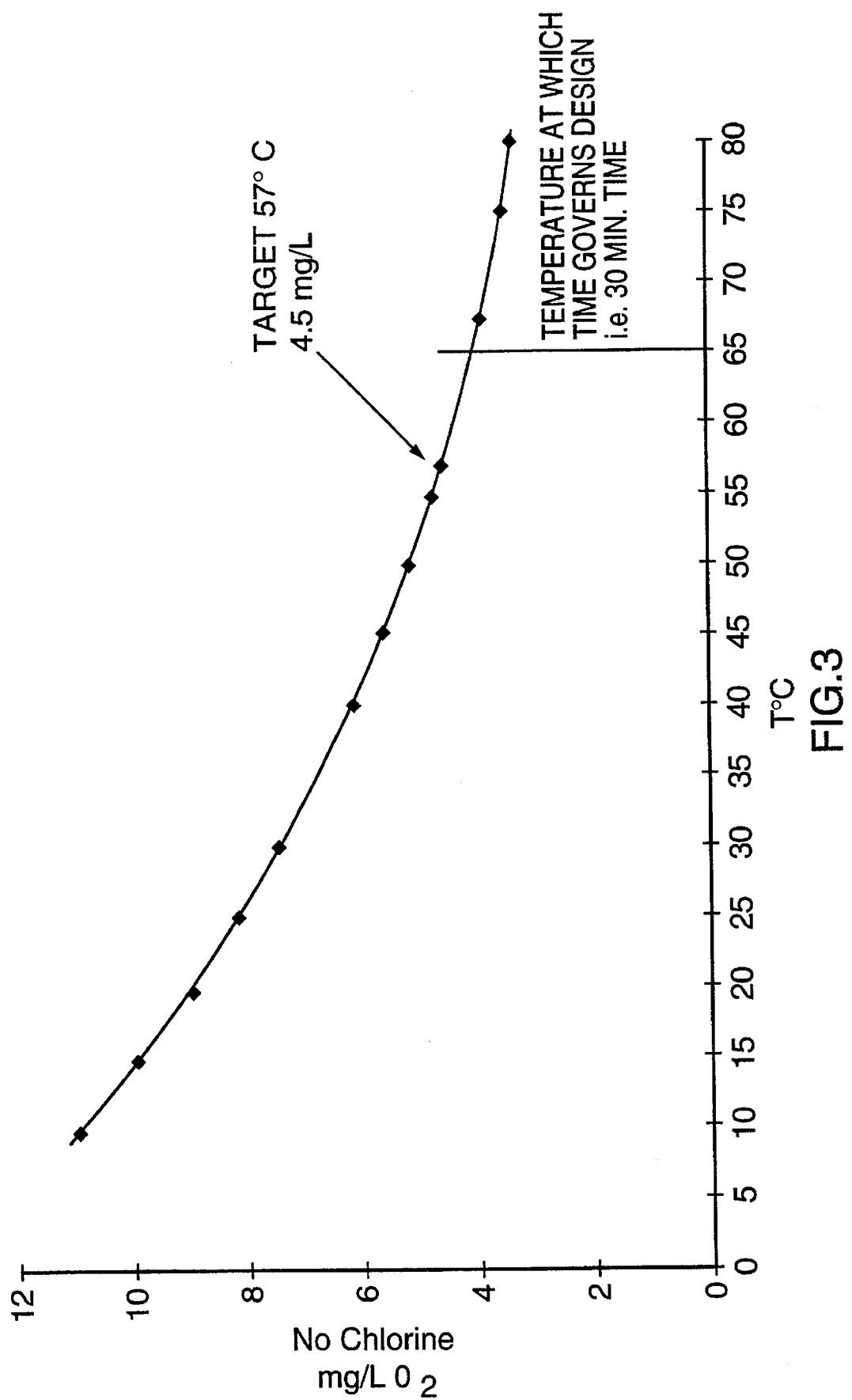
FIG. 3 is a graph of temperature (°C.) versus solubility of oxygen in water (mg/L)

FIG. 3 shows a graph of the solubility of oxygen in chlorine-free water against temperature (Water Environment Federation Manual of Practice No. 8, "Design of Municipal Waste Water Treatment Plants", 1991).

When circulation velocity in the upflow section stabilizes, air is added into main aeration head 22, via main air line 24 and start-up air is stopped in feed line 10. Feed line 10 can then be used to feed raw sludge D to zone 1 and deep aeration head 26 fed by deep air line 28 is started up. Main aeration head 22 is located 8–16 m below the end of draft tube 12 and is fitted with a radial non-plugging distribution cone 22. Main aeration head 22 is designed in such a manner as to act as an air brake (bubble brake) to substantially restrict the downward penetration of draft tube downflow 20 of zone 1 into the top of zone 11. In order for the downflow of zone 1 to enter zone 11, it must first traverse the bubble stream flowing upward from main aeration head 22. This interaction effectively slows or "brakes" the flow. The entrance velocity into zone 11 is very low (intermittent in batch feed) and is in the order of feet/min. to feet/hr. whereas the downflow in zone 1 is in the order of feet/sec. The velocity of the downflow in the draft tube is quite high, typically, 2–4 m/sec., and in consequence the bubbles from aeration head 22 do not enter the bottom end of draft tube 12 of zone 1. Similarly, because the downward entrance velocity of zone 11 is so slow, bubbles cannot be dragged down into zone 11, but circulate at the interface of zones I and 11, until eventual migration into up-flow 16. In addition, there are also bubbles originating from deep aeration head 26 flowing upward out of zone 11 through up-flow 16.

Zone 11 operates strictly in a plug flow mode with the only mixing due to bubbles originating at deep aeration head 26 located about ¾ of the distance to the bottom of zone 11. In an alternate embodiment, a ported draft tube 30 is extended down around deep aeration head 26, which converts zone 11 to a plug flow with high internal recycle. The lower F/M zone 11, which is more likely to generate foam is located beneath the higher F/M zone 1, which is more likely to biodegrade foam. The foam, which travels with the waste gas stream, is therefore transferred from zone 11 to zone 1, where it is less stable at the higher F/M.

A treated effluent extraction line 32 runs from the bottom of zone 11 to the surface for thickening or disposal. A most preferred design requirement of extraction line 32 is that the upward velocities are sufficient i.e. greater than 0.8 m/sec., to remove any settleable solids from the bottom of Reactor 11.

Figure 4:
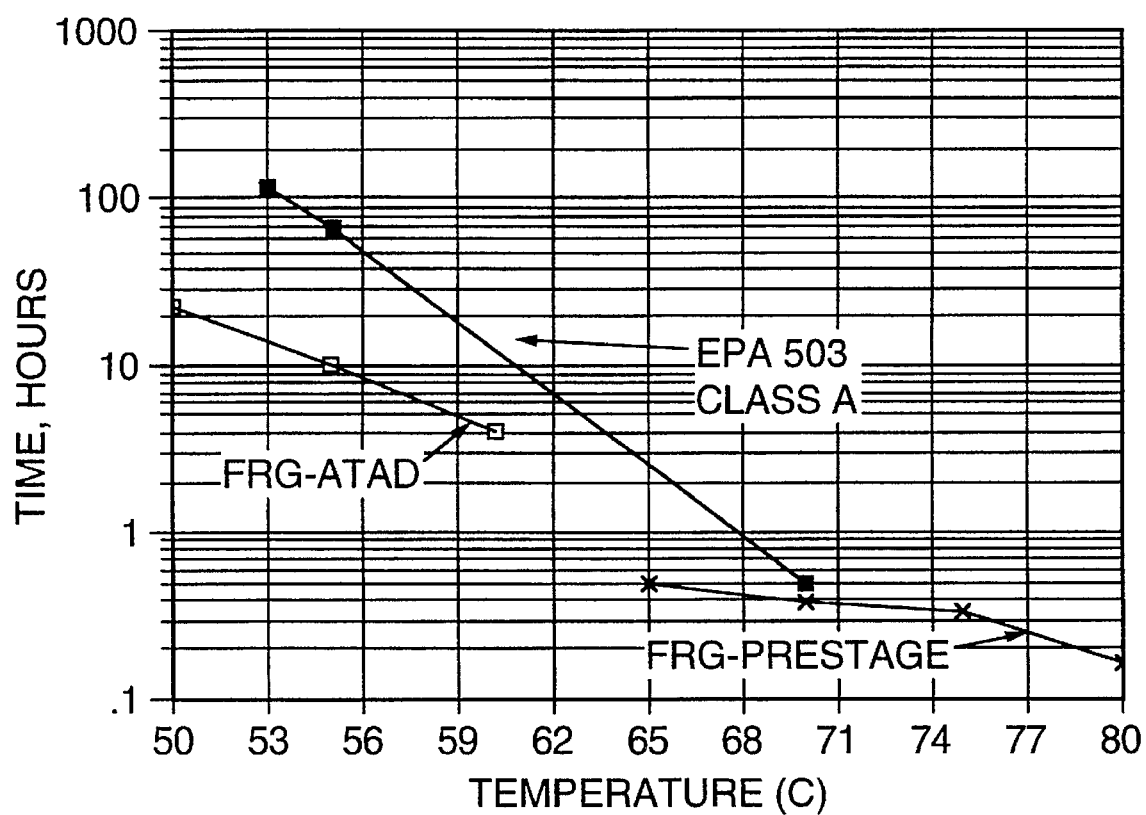
FIG. 4 is a graph of temperature (°C.) versus required sludge residence times (hrs.)

FIG. 4 illustrates the critical importance of temperature on the residence time required in the bioreactor for pathogen destruction in a Class A (EPA CFR40, Reg. 503) sludge (EPA Manual for Technology Transfer of ATAD-EPA/625/10-90/007, 1990). FIG. 4 shows that stenothermophils, efficacious at >60° C., can also operate effectively at least up to 80° C.

An alternative embodiment of the invention provides hot centrate 34 produced from upstream sludge thickening processes to deep aeration head 26 through deep air line 28. The centrate serves to increase the flow through the bottom of zone 11 and also dilute the treated sludge to solids concentration levels that are easily transported up deep extraction line 32. The centrate in air flows down to deep aeration head 26 and also serves to increase the density of the air/liquid fluid, which allows for greater injection depths with the same surface pressures as used in main aeration head 22, i.e. 100 pounds per square inch.

A yet further embodiment of the invention utilizes a downhole progressive cavity pump on deep extraction line 32. A 4% solids feed sludge fed into zone 1 and subsequently reduced 60% by digestion contains only about 2% solids at the exit of zone 11. This reduced level of solids is easily pumped.

A still yet further embodiment of the invention has air line 36 feeding into deep extraction line 32 at a point above main aeration head 22. This assists in air lift of effluent within line 32 or, in the event of solids blockage within the extraction line, assist in blowing the blockage loose after closing valve 38.

Off-gas can be pressurized in head tank 40 for utilization in VERTAD and VERTREAT processes. Gas from the aeration heads serves to bio-oxidize and mix the influent as well as increase dissolved oxygen levels. When migrating from lower to upper regions of the bioreactor, the gas transfers heat to the cooler influent in the upper regions and serves to assist in foam collapse and to regulate pH by $CO_2$ stripping. Back pressures created from the build-up of off-gas in the pressurized head tank applies hydraulic head to the fluid in the shaft, thereby assisting in the lift of the deep effluent extraction line 32.

Figure 2:
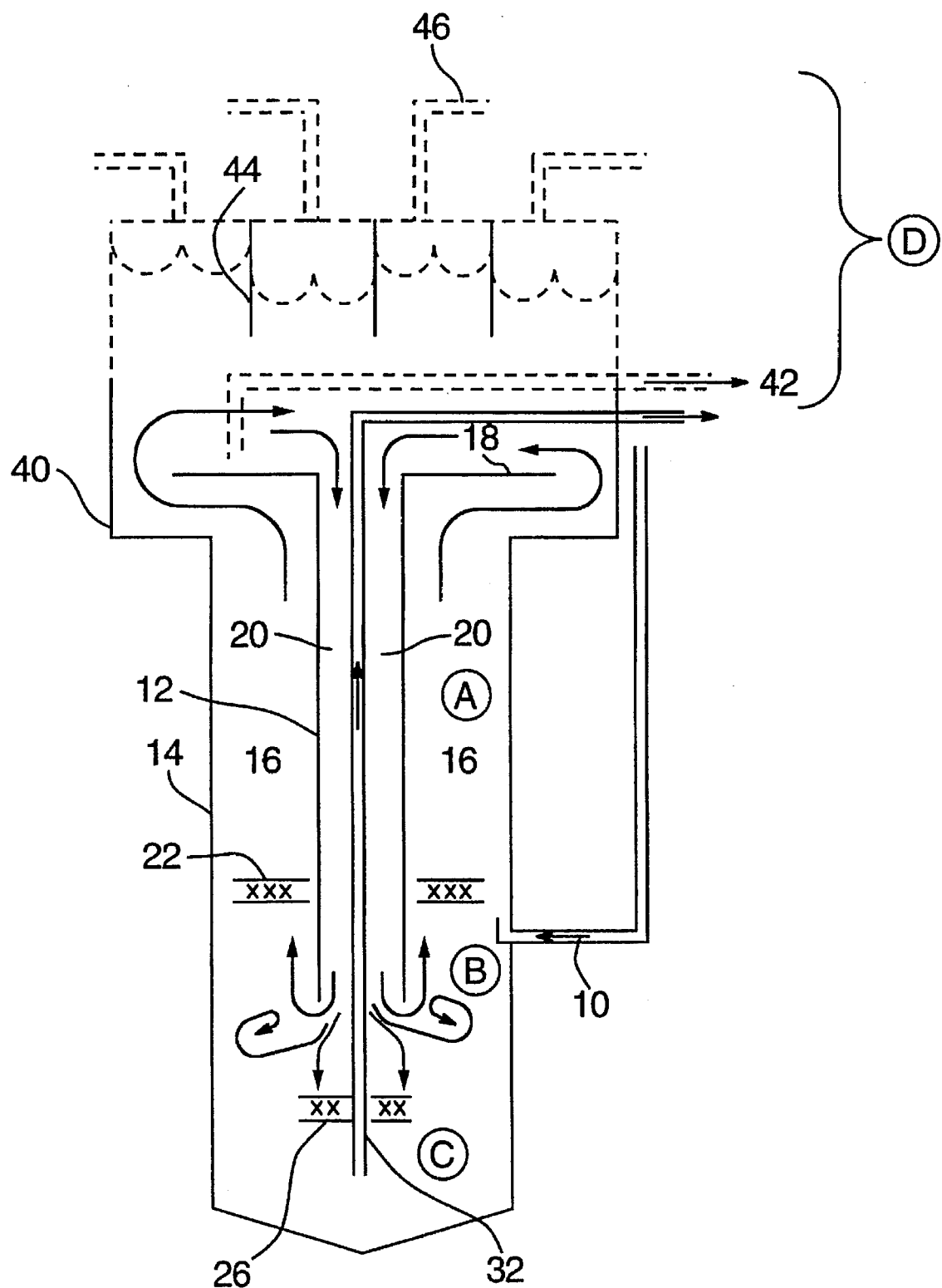
FIG. 2 is a diagrammatic vertical section through one embodiment of a bioreactor according to the invention for use in waste water treatment.

With reference now to FIG. 2, top section D of the VERTREAT reactor shown consists of a head tank with optional shallow effluent extraction line 42 and optional head tank baffles 44 and off-gas conduits 46 for biofilter aeration and treatment.

Compressed air enters the system through main aerator 22 into the annular space between draft tube 12 and reactor wall 14. Influent waste water enters the system through influent conduit 10 and is circulated by air lift through up-flow region 16, into head/surface tank 40, around a de-gassing plate 18, and is re-circulated back down the shaft through downflow region 20. The effluent then enters back mixing region B for further aeration and mixing. A portion of the effluent rises again through up-flow region 16 for recycling, while the remaining portion flows to the shaft bottom, against the upflow of air from deep aerator 26. Influent conduit 10 enters upflow region 16 at a point below the position of main aerator 22 to assist in the reduction of voidage (volume of air: volume of liquid ratio). This voidage increases as gas expands at lower pressures, when it rises up through region 16. Draft tube 12 diameter is minimized in order to maximize cross-sectional area of upflow region 16, which in effect reduces the flow rate of the upflow to increase residence time of the effluent and thereby increase the time for bio-oxidation activity. Effluent flowing to the shaft bottom enters plug flow region C, with no internal recycle, that effects an oxygen soak zone to increase levels of dissolved oxygen in the effluent, before it enters deep extraction line 32 and leaves the system for further downstream treatment, such as to a flotation-sedimentation vessel.

In one embodiment of the process of the present invention upper zone 1 operates continuously at a temperature selected from 45°–55° C. to provide efficacious bio-oxidation of the biomass by thermophilic microbes, while lower zone 11 operates continuously at a temperature selected from 55°–65° C. to provide efficacious bioxidation by thermophilic microbes. In an alternative process, the temperature within zone 1 and zone 11 is selected, respectively, from 20°–40° C. and 22°–44° C. for efficacious mesophile operation.

It is to be understood that modifications to the embodiments of the invention described and illustrated herein can be made without departing from the scope and spirit of the invention as defined in the appended claims.

I claim:

1. An improved biomass waste treatment process wherein an aerobic biological reaction takes place in a vertical chamber, said chamber having a first portion defining a first zone and a second portion defining a second zone below said first zone, said process comprising a) feeding a first biomass influent having a first biomass concentration to said first zone;
   b) feeding a first oxygen-containing gaseous stream to said first zone to effect mixing of said first oxygen-containing gaseous stream with said first biomass influent to effect circulation in unidirectional upward flow by gas lift and bioxidation to provide a first biomass effluent having a second biomass concentration;
   c) feeding said first biomass effluent in plug flow mode to said second zone;
   d) feeding a second oxygen-containing gaseous stream to said second zone to effect mixing of said second oxygen-containing gaseous stream with said first biomass effluent without re-circulation to said first zone to effect bioxidation and provide a second biomass effluent; and
   e) removing said second biomass effluent from said second zone.

2. A process as defined in claim 1 wherein said first oxygen-containing gas is fed to a lower part of said first zone.

3. A process as defined in claim 1 wherein said second oxygen-containing gas is fed to a lower part of said second zone.

4. A process as defined in claim 1 wherein said second zone comprises a portion defining a back-mix zone to prevent non-plug flow movement of said first biomass effluent from said first zone to said second zone.

5. A process as defined in claim 1 wherein said first zone contains thermophilic bacteria operating at a temperature selected from 45°–55° C. and said second zone contains thermophilic bacteria operating at a temperature selected from 55°–65° C.

6. A process as defined in claim 1 wherein said first zone contains mesophilic bacteria operating at a temperature selected from 20°–40° C. and said second zone contains mesophilic bacteria operating at a temperature selected from 22°–44° C.

7. A process as defined in claim 1 wherein said biomass is activated waste water.

8. A process as defined in claim 1 wherein said biomass is activated sludge.

9. An improved long vertical shaft bioreactor comprising a long vertical chamber having a first portion defining a first zone, and a second portion defining a second zone below said first zone;

means for feeding a first biomass influent to said first zone;
   means for feeding a first oxygen-containing gaseous stream to said first zone to effect mixing of said first gaseous stream with said first biomass influent to provide a first admixed stream and unidirectional flow of said admixed stream and bioxidation of said first biomass to provide a first biomass effluent having a second biomass concentration;

means for feeding said first biomass effluent in whole or in part in plug flow mode to said second zone;

means for feeding a second oxygen-containing gaseous stream to said second zone to effect mixing of said second oxygen-containing gaseous stream with said first biomass effluent to effect bioxidation without recirculation to said first zone to provide a second biomass effluent;

means for removing said second biomass effluent from said second zone.

10. A bioreactor as defined in claim 9 comprising partition means disposed within said first zone to assist unidirectional flow of said first biomass.

11. A bioreactor as defined in claim 10 comprising a surface basin in communication with said chamber and wherein said partition means comprises a vertical downcomer within said chamber.

* * * * *